Patented Oct. 12, 1948

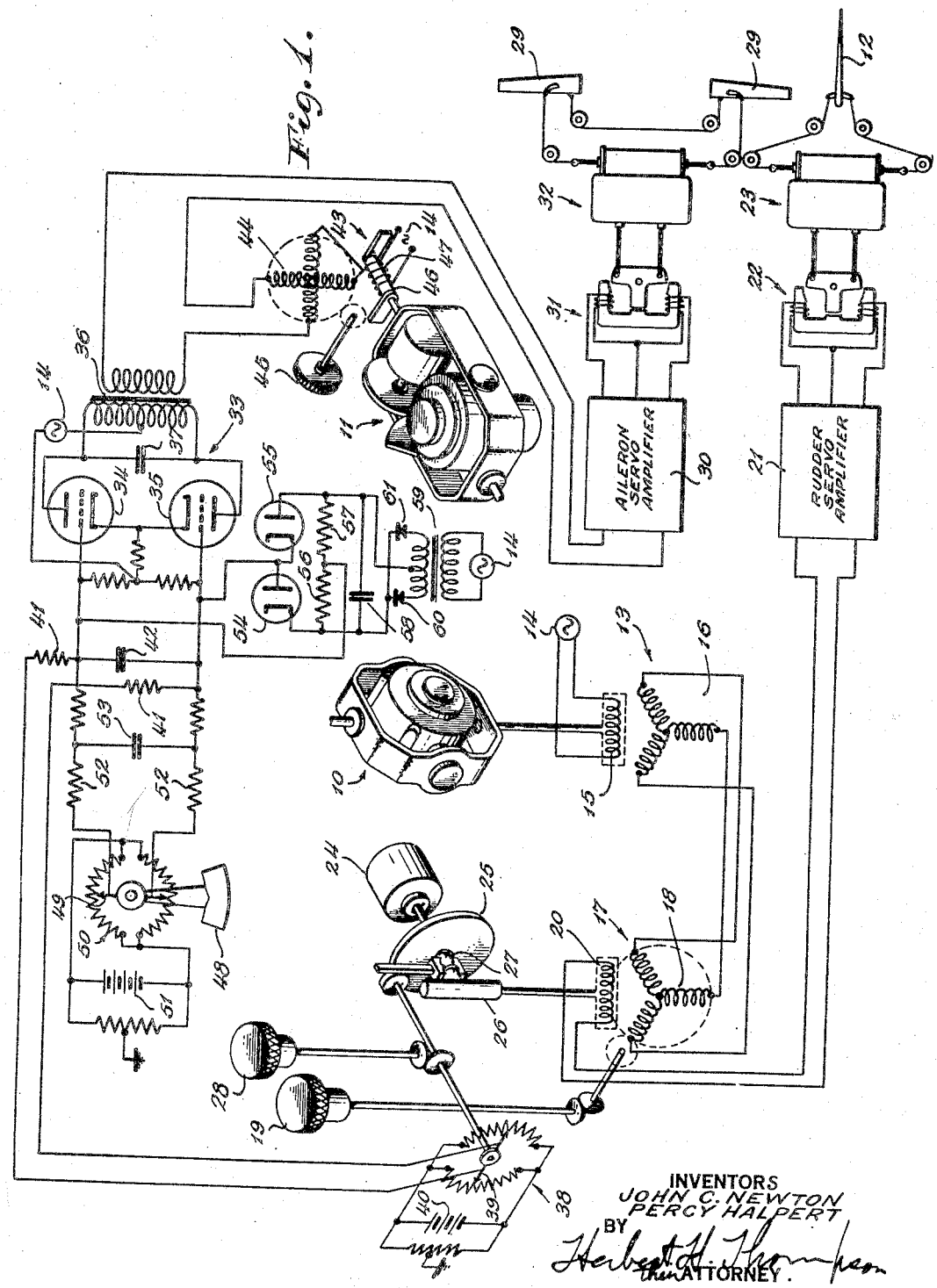

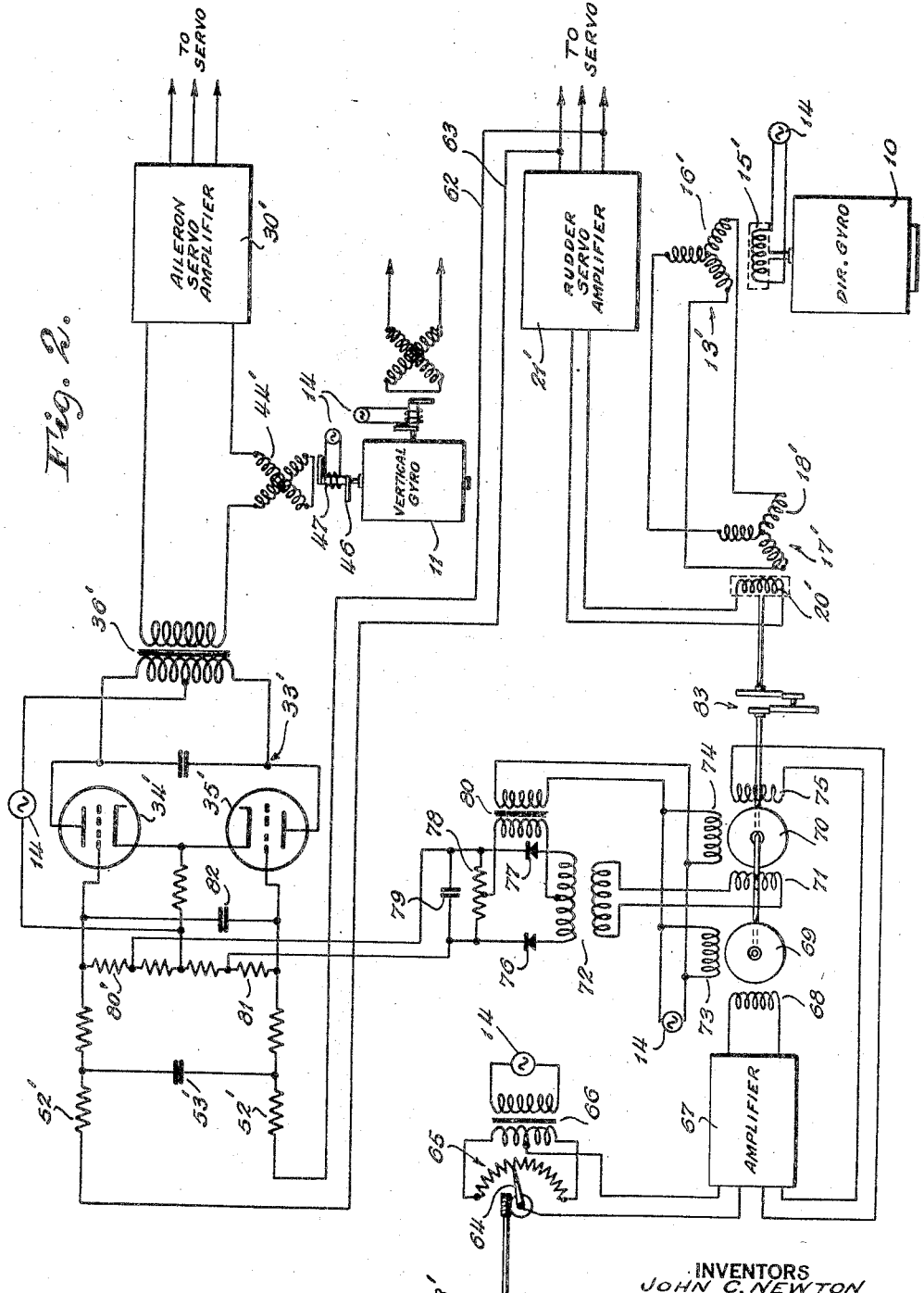

2,450,907

UNITED STATES PATENT OFFICE 2,450,907

TURN CONTROL MEANS FOR AN AUTOMATIC PILOT

John C. Newton, Bayside, and Percy Halpert, Hempstead, N. Y., assignors to The Sperry Corporation, a corporation of Delaware Application April 15, 1944, Serial No. 531,185

23 Claims. (Cl. 244—77)

This invention generally relates to aircraft autopilots and more particularly pertains to an automatic pilot that controls the banking of the craft during turns.

The present invention specifically concerns an improvement in autopilots having a manually settable turn control knob that simultaneously causes the craft to move about its vertical axis at a desired rate and to bank relative to its fore and aft or roll axis. The craft is banked by means of an arbitrary bank signal derived from the setting of the manual turn control knob, such signal controlling the aileron servo motor of the autopilot. The ailerons are thusly set to bank the craft for a desired rate of turn at a particular air speed which may be selected for designing purposes as the minimum air speed of the craft. If the craft is travelling at this speed a correctly executed turn is made with no side slip either toward or away from the center of the turn. When the speed of the craft is higher than such minimum speed, the arbitrary bank signal is insufficient to bank the craft enough to prevent outward side slip or skidding thereof. In order to maintain the turning craft at the proper banking angle for any air speed, the arbitrary bank signal supplied the aileron servo motor is supplemented by a further signal corresponding in magnitude to the operation of a device responsive to side slip. It will be understood that a turn is initiated by the rudder and is maintained by the ailerons which are controlled in accordance with the invention to minimize side slip of the craft.

Our invention relates to improvements in autopilots of the character shown and described in U. S. Patent 2,415,430 of February 11, 1945, to Carl A. Frische, Jefferson R. Wilkerson and one of the present inventors.

One of the objects of the invention is to obviate the necessity of by-passing the rate stage of the aileron servo amplifier shown in the above identified application with the arbitrary bank signal and the side slip correcting signal. This was required in the noted application so that any irregularity in moving the turn control knob would not be accentuated by the aileron rate amplifier of the autopilot.

A feature of the invention resides in provision of a circuit for supplying the aileron servo amplifier that includes electrical means fed by the combined arbitrary bank and side slip correcting signals. In accordance with the teaching of the invention the output of the provided electrical means is effective to move the craft about its bank axis until the same is balanced by the output of an electrical pick-off situated at the major axis of the gyro vertical instrument of the autopilot.

Other features, objects and structural details of the invention will be apparent from the following description when read in relation to the accompanying drawings, wherein Fig. 1 is a circuit diagram and schematic view showing an automatic pilot constructed in accordance with the present invention, and Fig. 2 is a view of a similar character illustrating a modified form of the invention.

As shown in Fig. 1, means for determining the attitude of the craft about its vertical axis is provided in the form of a directional gyro generally indicated at 10. This or other equivalent elements may be employed in the autopilot to provide an azimuth reference for heading the craft in a desired direction. Means for determining the attitude of the craft about its fore and aft and athwartship axes, respectively, roll and pitch axes, may be provided by a gyro vertical generally indicated at 11 or other equivalent elements in the autopilot. The rudder 12 of the craft is controlled by the directional gyro through means of a suitable pick-off device 13 shown in this instance, as an alternating current electrical transmitter of the "Selsyn" type.

The single phase winding of the device 13 is positioned in azimuth by the vertical ring of the directional gyro and is energized from a suitable source of alternating current 14. As shown in Fig. 1, the single phase wound rotor 15 of the device 13 is fixed to an extension of one of the trunnions of the vertical ring of the directional gyro. The stator 16 of the device 13 is fixed to the craft and is polyphase wound to produce output voltages depending on the angular disposition of the same relative to the rotor 15.

To provide for course changing for the craft in the autopilot, the output signal of the device 13 is fed to a differential controller in the form of a signal transformer 17 also of the "Selsyn" type. The input to the controller is supplied to the polyphase wound element 18 of the transformer 17 which in this instance is movably mounted. A course control knob 19 through suitable connecting mechanism determines the setting of element 18 of the transformer 17. For a given heading of the craft, course knob 19 remains fixed. The single phase wound element 20 of the controller 17 is rotatably mounted in the present instance, such winding producing a signal output whenever its position relative to element 18 differs from the position of the rotor 15 relative to the stator 16 of the pick-off device 13. The control signal is fed to the rudder servo amplifier 21 of the autopilot, the output of which controls a torque motor 22 that actuates a rudder servo motor 23 of the hydraulic type in the present showing. The electrical and hydraulic servo motors illustrated diagrammatically herein may be of the type shown and described in U. S. Patent 2,398,421 of April 16, 1946, for Electro-hydraulic control systems in the names of C. A. Frische, G. P. Bentley and one of the present inventors.

With the course knob 19 fixed and the element 20 of the controller stationary, the autopilot maintains the craft on its selected heading as follows. With a proper heading the output of the controller 17 is zero. Should the craft deviate from this heading for any reason, stator 16 of the pick-off device 13 moves relative to the rotor 15 and the output of the device is fed through controller 17 to the torque motor 22, the operation of which controls the servo motor 23 to actuate the rudder 12 so that the craft moves about its vertical axis until the stator 16 is restored to its proper position relative to the rotor 15. Inasmuch as rotor 15 is positioned in azimuth by the directional gyro, the same provides the directional reference of the autopilot. As described and shown in application Serial No. 284,642, the motor controlling amplifier 21 includes anti-hunting means in the form of rate circuits that produce velocity and acceleration components of the displacement signal output of the pick-off 13.

To change the course of the craft, the setting of knob 19 is altered, thus moving the element 18 of the controller so that a rudder controlling signal is produced to turn the craft until stator 16 is situated in the same angular relation to rotor 15 as the element 18 of the controller bears to element 20.

To control the rate of turn of the craft about its vertical axis as desired, the output element 20 of the controller 17 is rotated at a desired speed. In Fig. 1, a variable speed drive is employed for this purpose, the same deriving motion from a constant speed motor 24 that drives a friction disc 25. Cylinder 26 of the drive is rotated at the desired speed by the disc 25 through means of a ball carriage 27 that is displaceable radially of the disc. The position of the carriage 27 relative to the disc 25 is determined by a knob 28 and suitable connecting mechanism. Knob 28 is hereinafter referred to as the rate of turn knob, the same being manually settable to cause rotation of the element 20 of the controller 17 in a desired direction at a speed approximately proportional to the angular displacement of the knob from a zero position at which the ball carriage is at the center of the disc 25. In the showing in Fig. 1, a shaft directly connects the element 20 and the cylinder of the variable speed drive.

The signal output of the controller 17 when element 20 is turning is effective to turn the craft at a desired rate, the controller attempting to produce a constantly increasing signal that is counterbalanced or cancelled by the turning action of the craft, i. e., movement of stator 16 relative to the rotor 15 of the pick-off 13.

The ailerons 29 of the craft are shown in Fig. 1 as controlled by an aileron servo amplifier 30, torque motor 31 and hydraulic servo motor 32. Motors 31, 32 and amplifier 30 may be generally similar in character to the corresponding elements employed in connection with the rudder of the craft. In accordance with the teaching of the present invention none of the input provided the aileron operating servo motor by-passes the rate stages of the aileron servo amplifier. As shown in Fig. 1, electrical means in the form of a balanced modulator generally indicated at 33 provides an output controlling signal for the servo motor 32 whose amplitude and phase depends on the magnitude and polarity of a direct current input thereto. The modulator includes a pair of electron tubes 34 and 35 between the respective plates of which is situated the primary winding of an output transformer 36, the secondary of which feeds the aileron servo amplifier 30. The plates of the modulator are energized from an alternating current source 14 through a circuit that makes a center tap connection at the primary winding of the transformer 36. A further input circuit is provided the modulator, the same feeding the respective grids of the electron tubes 34 and 35 with a controlling signal of essentially D. C. With an input signal on the grids of a given polarity, one or the other of tubes 34 and 35 will pass current during the positive half cycles of the source 14, the resultant voltage appearing across the primary of the transformer. A tuning condenser 37 may be employed to improve the wave shape of the voltage appearing at the transformer, the frequency of the output being the same as the frequency of the source 14.

The modulator controlling signal is derived from a mixing circuit in which two direct current signals are combined, one of which corresponds to the rate of turn setting of the knob 28 and the other of which depends on side slip of the craft during the turn. The means for producing a direct signal corresponding to the rate of turn of the craft may include, as shown in Fig. 1, a potentiometer 38, the movable arm 39 of which is directly positioned by the control knob 28. Potentiometer 38 may be arranged in a bridge circuit energized by battery 40, the output of which is fed by way of suitable leads to be applied across the grids of the electron tubes 34 and 35. In order to prevent any sudden variations in the output signal of the modulator due to uneven movement of the turn control knob 28 in moving the same to a desired set position means are provided to integrate the signal from the potentiometer 38 controlled bridge. Such means may be situated in the input circuit to the modulator and includes resistors 41 in the respective leads to the grids of the tubes 34 and 35, and a condenser 42 that is situated across the grids. The elements of this integrating circuit may be selected to provide a circuit having a relatively short time constant such, for example, as half a second. The signal produced by the unbalanced potentiometer controlled bridge circuit, in this instance, is termed the arbitrary bank signal as the same is effective to actuate the aileron servo motor to cause movement of the craft about its roll axis.

In accordance with the teaching of the present invention the output of the modulator is effective to directly control the operation of the aileron servo motor until balanced by the output of a bank detecting pick-off device 43 at the gyro vertical 11. As shown in Fig. 1, the pick-off device 43 is a signal producing means of the "Telegon" type whose field windings 44 are situated in series in the output circuit of the modulator. Windings 44 in this instance are settable by a trim knob 45 so that output of the pick-off may be adjusted to accommodate for different trim conditions on the craft. The Z-shaped armature of this type pick-off is indicated at 46, the stationary winding 47 thereof being energized from source 14. This particular signal generating pick-off produces an alternating output whose frequency is the same as the frequency of the modulator, whose amplitude depends on the angle of bank and whose phase depends on the direction of bank. When the signal of the pick-off 43 balances the output of the modulator, the input to the aileron servo amplifier 30 is zero and the servo motor 32 is rendered ineffective.

In order to properly bank the craft at any air speed, the output of the modulator is modified in accordance with side slip of the craft. As shown in Fig. 1, the improved autopilot includes means responsive to side slip of the craft in the form of a pendulum 48 whose axis is parallel to or coincident with the fore and aft axis, herein termed bank or roll axis, of the craft. Suitable means (not shown) may be employed to damp the movements of the pendulum about its axis. In the present showing, the pendulum positions the arm 49 of a potentiometer 50 to normally balance a bridge circuit that includes a battery 51 when the aircraft is level and free from lateral acceleration. The bridge circuit is unbalanced responsive to side slip of the craft or movement of the pendulum in this instance to produce a direct current signal of reversible polarity across the respective grids of the modulator 33. The input circuit to the modulator combines the side slip correcting signal with the hereinbefore described arbitrary bank signal to obtain a single resultant of definite polarity and magnitude, such resultant determining the phase and amplitude of the output signal of the modulator.

Means for integrating the input to the modulator from the bridge circuit under control of the side slip responsive means may include the indicated resistors 52 and shunt condenser 53. The elements of this integrating circuit may be selected to provide a circuit having a relative long time constant, for example, ten seconds. This is effective to prevent too rapid fluctuations in the input circuit from the bridge circuit responsive to side slip. The total voltage input to the modulator is limited in the present instance by an electronic voltage limiter that includes the paired diode tubes 54 and 55, and resistors 56 and 57. The diodes are biased by the output of a suitable full wave rectifying circuit that includes an alternating current by-passing condenser 58, transformer 59 and copper oxide rectifiers 60, 61, the constant bias of the tubes being such that neither of the same conduct current until the voltage in the input circuit is sufficient to overpower the said bias. The bias for the respective tubes is modified by the sum of the voltage inputs to the tube grids so that depending on the polarity of the signal, one of the other of tubes 54, 55 conducts when the signal reaches its permitted limit. This action shorts the circuit through either resistor 56 or 57 and prevents the input to the grids from exceeding the desired limit.

The operation of the autopilot is as follows. To initiate a turn at a desired rate the knob 28 is moved to a corresponding setting. This causes the element 20 of the controller 17 to turn and results in operation of the rudder servo motor 23 to move the rudder to initiate turning motion of the craft about its vertical axes at a desired rate. At the same time, the potentiometer 38 controlled bridge circuit has been unbalanced by the setting of the knob 28 so that an arbitrary bank signal is fed to the grids of the modulator and an aileron controlling output is derived therefrom that is effective to bank the craft. If the craft is not banked sufficiently for the desired rate of turn, the craft side slips and the means responsive to side slip is then rendered effective. The potentiometer 50 controlled bridge circuit is then effective to supply a voltage that either supplements or detracts from the arbitrary bank signal to the modulator, the output of the modulator being modified thereby to correct the banking angle of the craft and maintain the turn of the craft at the desired rate.

In the modification shown in Fig. 2, the side slip correction signal is derived from the direct current output of the rudder servo amplifier 21' by way of leads 62, 63 which connect with the grids of the modulator 33'. This signal may be obtained in this manner inasmuch as with an incorrect bank angle and consequent side slip, the turn is not maintained at a uniform rate and the element 20' of the controller moves at a different speed than the stator 16' of the pick-off 13'. As a result a signal is produced by the controller 17' that is proportional to side slip of the craft. This signal causes the rudder servo to reestablish the turn rate at the desired value and is employed in the manner hereinbefore described to correct the banking angle of the craft. In the modified form of the invention, the rate of turn knob 28' positions the movable arm 64 of a potentiometer 65 supplied with alternating current from source 14 by way of transformer 66. The reversible phase output of the potentiometer 65 is amplified by suitable amplifying means as generally indicated at 67 and fed to the control winding 68 of a variable speed motor 69. Motor 69 turns at a speed proportional to the setting of the knob 28' and drives the element 20' of the controller through a suitable reduction gearing generally indicated at 83.

In the preferred form of the invention as shown in Fig. 2, a constant frequency generator 70 is directly driven by the motor 69. The output winding 71 of the generator feeds a signal to the primary winding of the transformer 72 for the purpose of causing the craft to bank in proportion to the rate of turn thereof. The motor and generator are continuously excited from source 14 by the respective windings 73 and 74. A second output winding 75 is provided the generator 70, the voltage therein being fed back to the amplifier 67 in opposing relation to the input signal to the amplifier from the potentiometer 65. Generator 70 produces two outputs the amplitudes of which depend on the speed of the motor 69 and the phases of which depend on the direction of rotation of the motor. A phase sensitive detecting circuit may be provided for the generator output of winding 71 including rectifiers 76, 77, a resistor 78 and alternating current by-pass condenser 79. This circuit is also fed from source 14 by way of transformer 80, the secondary winding of which is connected across a center tap position on the secondary of the transformer 72 and resistor 78. The rectified output of this circuit is applied across the grids of the tubes 34', 35', the leads thereto including resistors 80', 81. The resistors 80', 81, with the condenser 82 across the grids of the tubes 34' and 35' provides an integrating circuit for the arbitrary bank signal to the modulator. The means for limiting the input to the modulator is not shown in this form of the invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft, means for banking the craft during turns comprising a servo motor operatively connected to the ailerons of the craft, electrical means for providing an alternating current controlling signal for said motor whose amplitude and phase depends on the magnitude and polarity of a direct current input thereto, means responsive to side slip of the craft, means operable under control of said side slip responsive means for producing a corresponding direct current signal, means for producing a second direct current signal corresponding to the rate of turn of the craft, and an input circuit to said electrical means in which the respective direct current signals are mixed.

2. An automatic pilot as claimed in claim 1, in which said means for producing a second direct current signal includes a constant frequency generator whose output is dependent upon its speed and direction of rotation, and a phase sensitive detecting circuit for the output of said generator.

3. An automatic pilot as claimed in claim 1, in which said electrical means is a balanced modulator that is fed by the mixed direct current signals of the input circuit.

4. An automatic pilot as claimed in claim 1, in which the input circuit to said electrical means includes means for integrating the direct current signal produced under control of the side slip responsive means.

5. An automatic pilot as claimed in claim 1, in which the input circuit to said electrical means includes means for integrating the direct current signal corresponding to the rate of turn of the craft.

6. An automatic pilot as claimed in claim 1, in which said input circuit includes means for limiting the total direct current signal fed said electrical means.

7. An aircraft autopilot having turn and bank controlling means including a servo motor for controlling the craft about its bank axis, electrical means for providing an alternating current controlling signal for said motor whose amplitude and phase depends on the magnitude and polarity of a direct current input thereto, means responsive to side slip of the craft, means operable under control of said side slip responsive means for producing a corresponding direct current signal, means for controlling the rudder of the craft to move the same about its turn axis, means for producing a second direct current signal corresponding to the rate of turn of the craft, a mixing circuit for the respective direct current signals providing the input to said electrical means, said motor operating responsive to the output of said electrical means to move the craft about its bank axis, and means for balancing the output of said electrical means to controllably bank the craft comprising a signal producing means whose amplitude is dependent on the angle of bank and whose phase is dependent on the direction of bank.

8. An autopilot of the character claimed in claim 7 in which said electrical means is a balanced modulator.

9. Means for controlling the attitude of a craft about its roll axis during turns comprising a bank controlling servo motor, and circuit means for energizing said motor including a signal generator producing an alternating current output whose amplitude is dependent on the angle of bank and whose phase is dependent on the direction of bank, and a balanced modulator producing an alternating current output whose amplitude and phase depends on the magnitude and polarity of a direct current input, means for producing a direct current signal in accordance with the rate of turn of the craft, means for producing a direct current signal in accordance with side slip of the craft, and an input circuit to said modulator combining the respective direct current signals.

10. Means of the character claimed in claim 9, in which said input circuit includes means for integrating the direct current signal of said means producing a signal in accordance with the rate of turn of the craft.

11. Means of the character claimed in claim 9, in which said input circuit includes a voltage limiter that limits the voltage input to the modulator.

12. In an aircraft autopilot, an aileron operating servo motor, manually controllable means for producing an arbitrary bank direct current signal corresponding to a desired rate of turn of the craft, means for integrating the signal produced by said manually controllable means, means for producing a direct current signal in accordance with side slip of the craft, means for integrating the side slip signal, means for combining the integrated side slip signal and the integrated arbitrary bank signal, and means for controlling said servo motor in accordance with the combined signals.

13. An autopilot as claimed in claim 12, in which said bank signal integrating means is a circuit having a relatively short time constant and said side slip signal integrating means is a circuit having a relatively long time constant.

14. In an aircraft autopilot, an aileron operating servo motor, means for producing a signal corresponding to a desired rate of turn of the craft, variable speed motive means responsive to said turn signal, a constant frequency generator driven by said motive means producing an arbitrary bank signal, a phase sensitive detecting circuit for the signal of said generator, means for producing a direct current signal proportional to side slip of the craft, means for combining the side slip signal and the detected signal of said generator, and means for controlling said servo motor in accordance with the output of said combining means.

15. An autopilot as claimed in claim 14, in which said combining means is a balanced modulator.

16. In an aircraft autopilot, an aileron operating servo motor, means for producing a signal corresponding to a desired rate of turn of the craft, variable speed motive means responsive to said turn signal, means controlled by said motive means for producing an arbitrary bank signal, means for producing a signal corresponding to side slip of the craft, means for combining the signals of said side slip signal producing means and said arbitrary bank signal producing means, and means for controlling said servo motor in accordance with the output of said combining means.

17. In an aircraft automatic pilot, a servo motor connected to operate one of the control surfaces of the craft, means for producing a signal corresponding to a desired rate of turn of the craft, motive means responsive to said turn signal to selectively rotate in the direction governed by and at a speed proportional to said signal, and a constant frequency generator driven by said motive means to provide a signal for operating said servo motor whose amplitude varies with the speed of rotation of said motive means and whose phase depends on the direction of rotation of said motive means.

18. In an aircraft automatic pilot, an aileron operating servo motor, means for producing a signal corresponding to a desired rate of turn of the craft, motive means responsive to said turn signal producing means, a generator driven by said motive means producing two outputs, means for feeding one of the outputs of said generator to said servo motor, and means for feeding the other of the outputs of said generator to said motive means in opposition to the signal of said turn signal producing means.

19. In an aircraft automatic pilot, a rudder operating servo motor, means for producing a signal corresponding to a desired rate of turn of the craft, motive means responsive to said turn signal producing means, means driven by said motive means for operating said servo motor, a generator driven by said motive means producing an output, and means for feeding the output of said generator to said motive means in opposition to the signal of said turn signal producing means.

20. In an aircraft automatic pilot, a rudder operating servo motor, an aileron operating servo motor, means for producing a signal corresponding to a desired rate of turn of the craft, motive means responsive to said turn signal producing means, means driven by said motive means for operating said rudder servo motor, a generator driven by said motive means producing an output, and means for operating said aileron servo motor in accordance with the output of said generator.

21. In an aircraft automatic pilot, a rudder operating servo motor, an aileron operating servo motor, means for producing a signal corresponding to a desired rate of turn of the craft, motive means responsive to said turn signal producing means, means driven by said motive means for operating said rudder servo motor, a generator driven by said motive means producing two outputs, means for feeding one of the outputs of said generator to said aileron servo motor, and means for feeding the other of the outputs of said generator to said motive means in opposition to the signal of said turn signal producing means.

22. In an aircraft automatic pilot, an aileron operating servo motor, normal anti-roll signal means for controlling said motor, means for producing a signal corresponding to a desired rate of turn of the craft, motive means responsive to said turn signal to selectively rotate in the direction governed by and at a speed proportional to said signal, and a generator driven by said motive means, the output thereof opposing said anti-roll signal to properly bank the craft according to the direction and rate of turn.

23. An aircraft automatic pilot including a servo motor for controlling the craft about its vertical axis, a servo motor for controlling the craft about its longitudinal axis, means for producing a signal corresponding to a desired rate of turn of the craft, motive means responsive to said turn signal producing means, means driven by said motive means for operating one of said servo motors, a generator driven by said motive means producing an output, means for operating said other servo motor in accordance with the output of said generator, a side slip or skid detector producing an output, and means for modifying the input to one of said servo motors in accordance with the output of said side slip or skid detector.

JOHN C. NEWTON.
PERCY HALPERT.

REFERENCES CITED

The following references are of record in the file of this patent:

UNITED STATES PATENTS

| Number | Name | Date |
|---|---|---|
| 2,137,974 | Fischel | Nov. 22, 1938 |
| 2,162,862 | Protzen | June 20, 1939 |
| 2,190,390 | Thiry | Feb. 13, 1940 |
| 2,238,300 | Zand et al. | Apr. 15, 1941 |